United States Patent
McCauley

(10) Patent No.: US 11,375,121 B2
(45) Date of Patent: Jun. 28, 2022

(54) CAMERA AND GRAPHICAL USER INTERFACE

(71) Applicant: GoPro, Inc., San Mateo, CA (US)

(72) Inventor: Grant Adam McCauley, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/575,622

(22) Filed: Sep. 19, 2019

(65) Prior Publication Data

US 2020/0092493 A1 Mar. 19, 2020

Related U.S. Application Data

(60) Provisional application No. 62/733,605, filed on Sep. 19, 2018.

(51) Int. Cl.
  *H04N 5/232* (2006.01)
  *H04N 5/225* (2006.01)

(52) U.S. Cl.
  CPC .............. *H04N 5/232939* (2018.08)

(58) Field of Classification Search
  None
  See application file for complete search history.

(56) References Cited

U.S. PATENT DOCUMENTS

| | | |
|---|---|---|
| D722,325 S | 2/2015 | Williams |
| D736,830 S | 8/2015 | Lyman |
| D761,277 S | 7/2016 | Harvell |
| D763,910 S | 8/2016 | Drozd |
| D783,672 S | 4/2017 | Rajasankar |
| D788,122 S | 5/2017 | Tada |
| D806,114 S | 12/2017 | Kim |
| D835,671 S | 12/2018 | Hong |
| D837,807 S | 1/2019 | Baber |
| D888,079 S | 6/2020 | Lee |
| D888,732 S | 6/2020 | Momchilov |
| D891,442 S | 7/2020 | Baber |
| D892,136 S | 8/2020 | Baber |
| D913,318 S | 3/2021 | Jenoski |
| D914,033 S | 3/2021 | Boeckle |
| D920,348 S | 5/2021 | Patel |
| 10,999,516 B1 | 5/2021 | McCauley |
| D922,403 S | 6/2021 | Yang |
| D929,413 S | 8/2021 | Kim |
| D929,417 S | 8/2021 | Li |
| D929,433 S | 8/2021 | Kim |
| D929,443 S | 8/2021 | Ramamurthy |

(Continued)

OTHER PUBLICATIONS

"How to Record on Snapchat Hands Free!" screenshot at 1:12, by Khoa, https://youtu.be/prGs-3lfVlo, posted May 5, 2017 (retrieved from Internet Aug. 20, 2020), 1 page.

(Continued)

*Primary Examiner* — Mark T Monk
(74) *Attorney, Agent, or Firm* — Young Basile Hanlon & MacFarlane, P.C.

(57) ABSTRACT

A camera includes an image sensor, a display, and a controller. The controller operates the image sensor to record a video recording and operates the display to display a graphical user interface. The graphical user interface includes an elapsed time indicator that increases in length as time elapses to form a border around the display.

20 Claims, 13 Drawing Sheets

(56) References Cited

U.S. PATENT DOCUMENTS

| | | | | |
|---|---|---|---|---|
| 2008/0004012 | A1* | 1/2008 | Polzin | G06F 1/1698 |
| | | | | 455/435.1 |
| 2008/0312897 | A1* | 12/2008 | Bracke | H04N 5/782 |
| | | | | 703/17 |
| 2010/0021140 | A1* | 1/2010 | Ando | G11B 27/34 |
| | | | | 386/329 |
| 2010/0171861 | A1* | 7/2010 | Ota | H04N 5/23293 |
| | | | | 348/333.02 |
| 2013/0044993 | A1* | 2/2013 | Akita | H04N 5/23216 |
| | | | | 386/225 |
| 2013/0324192 | A1* | 12/2013 | Lee | G06F 3/0486 |
| | | | | 455/557 |
| 2014/0173439 | A1 | 6/2014 | Gutierrez | |
| 2016/0325681 | A1* | 11/2016 | Van Dan Elzen | H04N 5/77 |
| 2016/0357370 | A1* | 12/2016 | Willey | G06F 3/0482 |
| 2017/0043217 | A1* | 2/2017 | Lee | G06K 9/00342 |
| 2017/0076699 | A1* | 3/2017 | Tichauer | G09G 5/003 |
| 2020/0092493 | A1 | 3/2020 | McCauley | |

OTHER PUBLICATIONS

How to Make a Rectangular Clockwise Progress in iOS, by iOS Dev, stackoverflow.com [online], published on Dec. 11, 2017, [retrieved on Jul. 301, 2021, retrieved from the Internet <URL: https://stackoverflow.com/questions/47749412/how-to-make-a-rectangular-clockwise-progress-in-ios> (Year: 2017).

Progress Bar Along the Borders of a Rectangle, by vromanch, stackoverflow.com [online], published on Jul. 13, 2015, [retrieved on Jul. 311, 2021, retrieved from the Internet <URL: https://stackoverflow.com/questions/319961 10/progress-bar-along-the-borders-of-a-rectangle> (Year: 2015).

Progress Bars and Loading Indicators for Vue.js, vuejsexamples.com [online], published on Nov. 2, 2017, [retrieved on Jul. 301, 2021, retrieved from the Internet <URL: https://vuejsexamples.com/progress-bars-and-loading-indicators-for-vue-js/> (Year: 2017).

Vue-Progress-Path-Demo, by Chau, github.io [online], published on Sep. 22, 2017, [retrieved on Jul. 301, 2021, retrieved from the Internet <URL: https://akryum.github.io/vue-progress-path/> (Year: 2017).

* cited by examiner

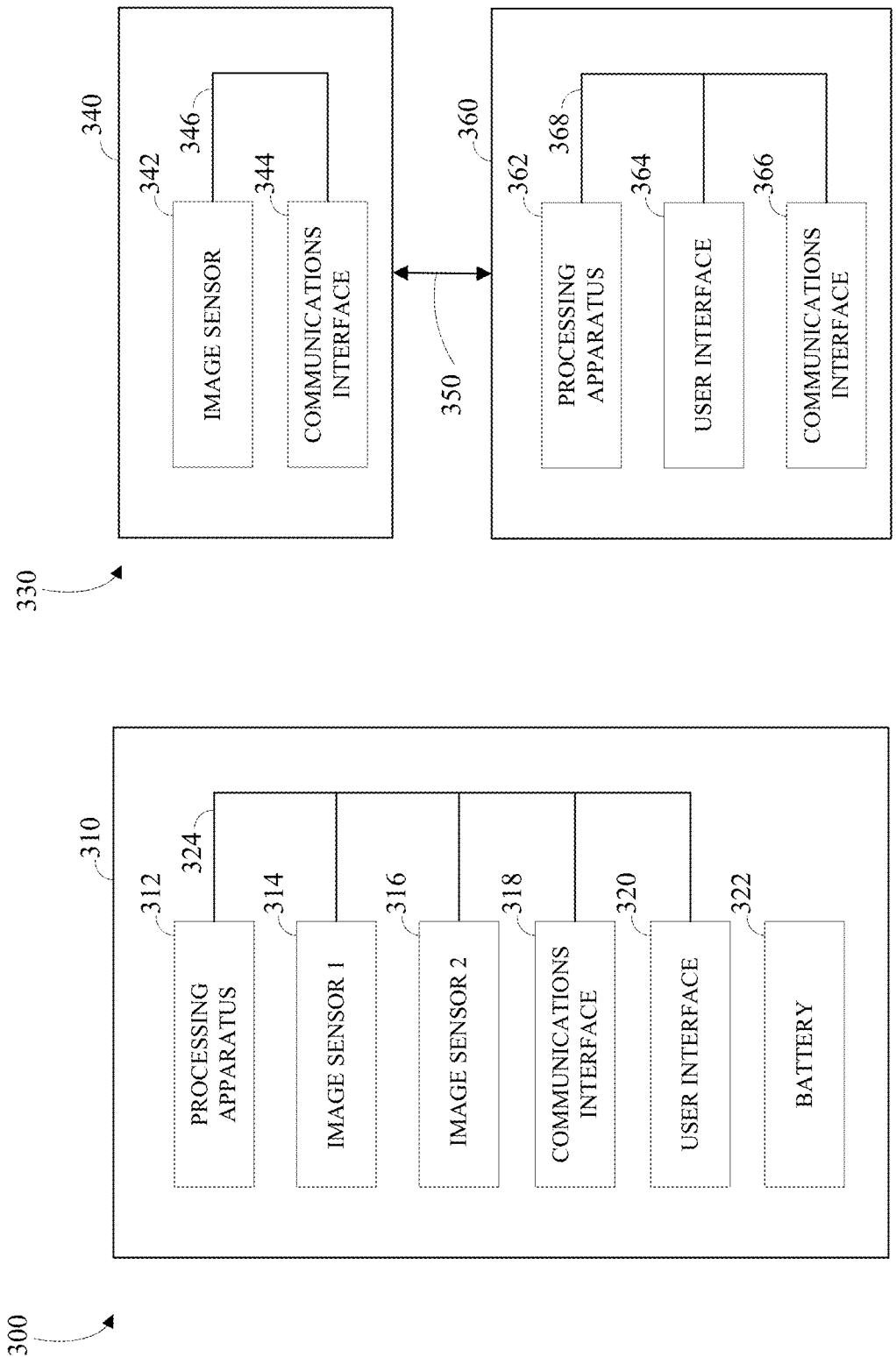

CAMERA AND GRAPHICAL USER INTERFACE

CROSS-REFERENCE TO RELATED APPLICATION(S)

This application claims priority to and the benefit of U.S. Provisional Patent Application No. 62/733,605, filed Sep. 19, 2018, the entire disclosure of which is hereby incorporated by reference.

TECHNICAL FIELD

This disclosure relates to cameras and, in particular, digital cameras and graphical user interfaces thereof.

BACKGROUND

Digital cameras may include graphical user interfaces that users with various information pertaining to the camera and images or recordings captured thereby. The manner in which such information is presented may, however, be ineffective in communicating to the user and/or may interfere with presentation of other information to the user.

SUMMARY

Disclosed herein are implementations of cameras and graphical user interfaces thereof. A camera includes an image sensor, a display, and a controller. The controller operates the image sensor to record a video recording and operates the display to display a graphical user interface. The graphical user interface includes an elapsed time indicator that increases in length as time elapses to form a border around the display.

The elapsed time indicator may increase to a completed length corresponding to the predetermined recording duration. The elapsed time indicator may increase in length until a shorter of the elapsed time equals a predetermined recording duration or the recording is stopped by a user. The camera may include a second display that displays another graphical interface having another elapsed time indicator. The other elapsed time indicator increases in length as the time elapses to form another border around the second display. The elapsed time indicator may have a color that contrasts with an image stream of the graphical user interface.

A camera includes an image sensor, a display, and a physical button. When the physical button is pressed by a user, a video having a predetermined time limit is captured with the image sensor. The display displays a graphical user interface having a graphical indicator that forms a border of the display to indicate elapsed time of the video recording.

A method is provided for recording a video with a camera having a display. The method includes: establishing a predetermined recording duration; initiating a video recording upon receipt of a user input; recording, with an image sensor, the video recording and simultaneously displaying, with a display, a graphical user interface having an elapsed time indicator than lengthens to form a border around the display indicating time elapsed of the video recording; and stopping the recording upon the shorter of receiving another user input or until the time elapsed equals the predetermined recording duration.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Disclosed herein are embodiments of cameras, graphical user interfaces (GUI) of the cameras, and methods of operating the cameras with the graphical user interfaces. The cameras may also be referred to as image capture devices. During a video recording of a predetermined recording duration (e.g., a time limit), the graphical user interface displays a border that provides a non-numerical visual indication of elapsed time of the recording, which may be referred to as an elapsed time indicator. While a completed length of the border formed by the elapsed time indicator represents the predetermined recording duration, the elapsed time indicator lengthens relative to the completed length proportionally to time elapsing relative to the predetermined duration. The border extends around the display and/or live images displayed thereon.

During the recording, the graphical user interface may also display the border to indicate remaining time of the predetermined duration, which may be referred to as a remaining time indicator. The remaining time indicator may extend from the elapsed time indicator, such that the elapsed time indicator and the remaining time indicator cooperatively form the completed length of the border. As time elapses during the recording, the elapsed time indicator lengthens, while the remaining time indicator shortens.

Figure 1A:
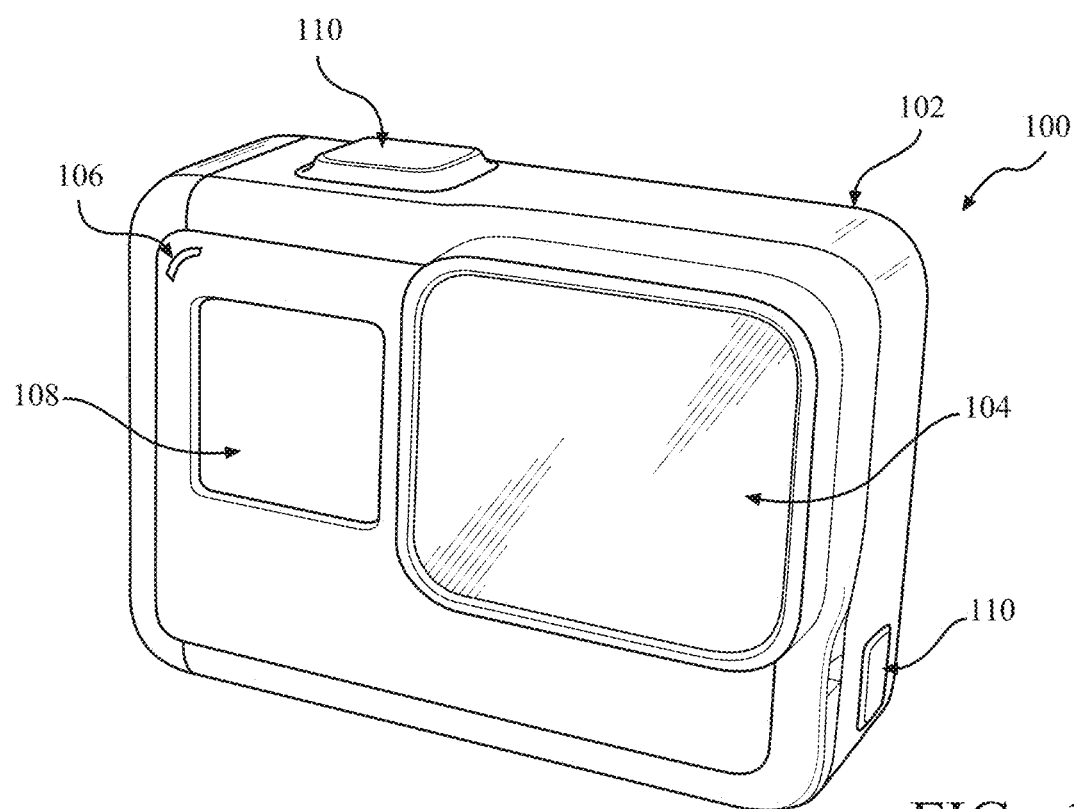
FIGS. 1A-C are perspective views of an example of an image capture device.
Figure 1B:
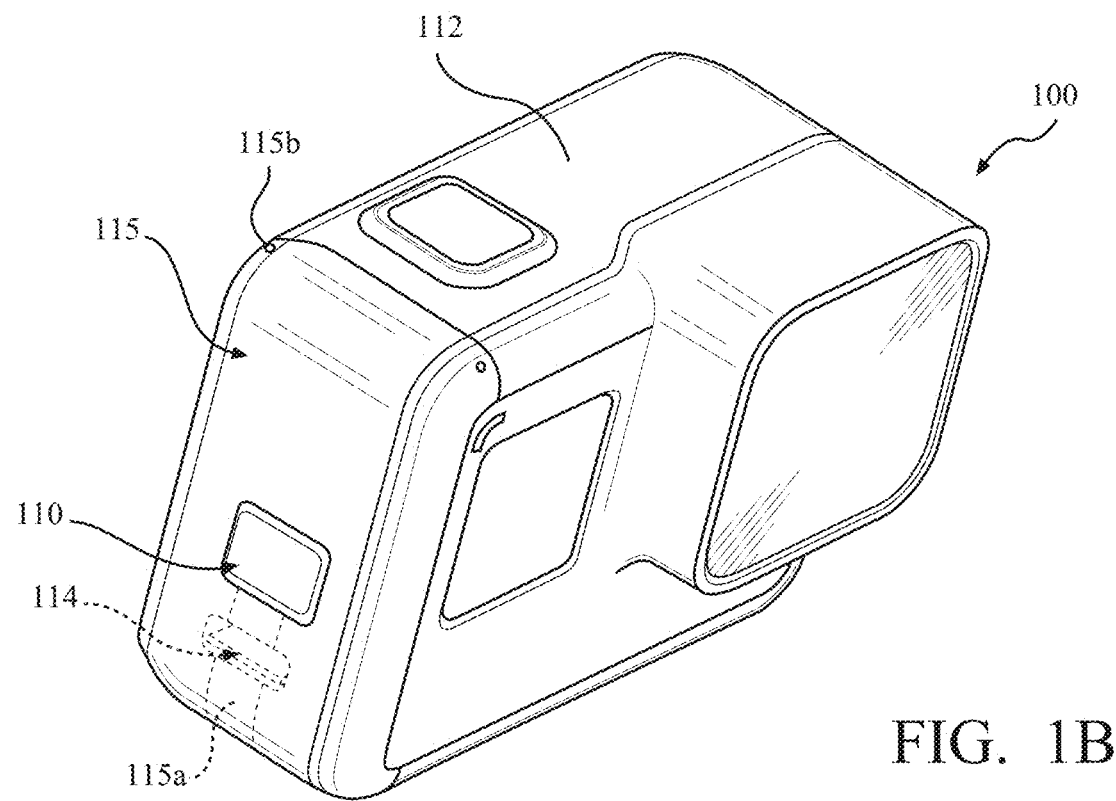
Figure 1C:
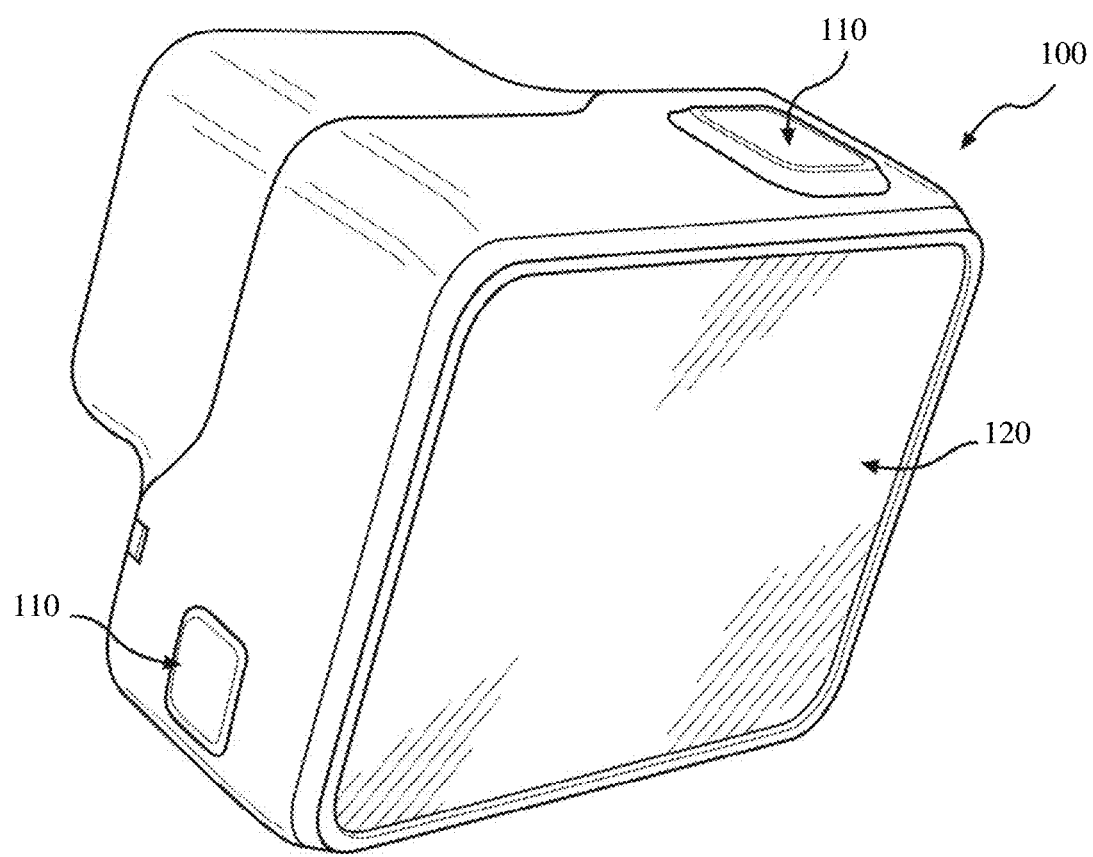

FIGS. 1A-C are perspective views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone integrated into the body 102 or housing. The front surface of the image capture device 100 may include two drainage ports as part of a drainage channel. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-C includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link. 22

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
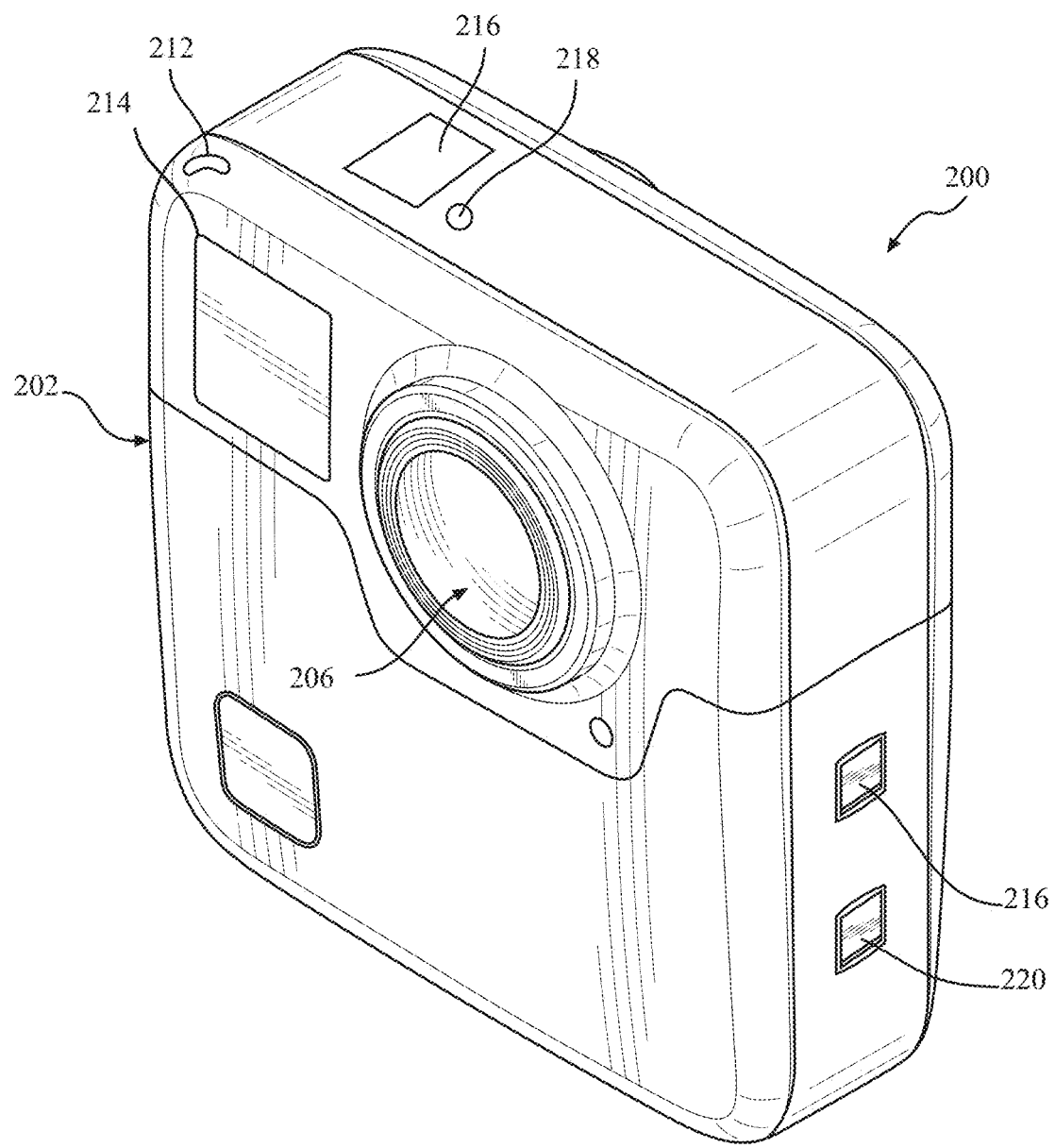
FIGS. 2A-B are perspective views of another example of an image capture device.
Figure 2B:
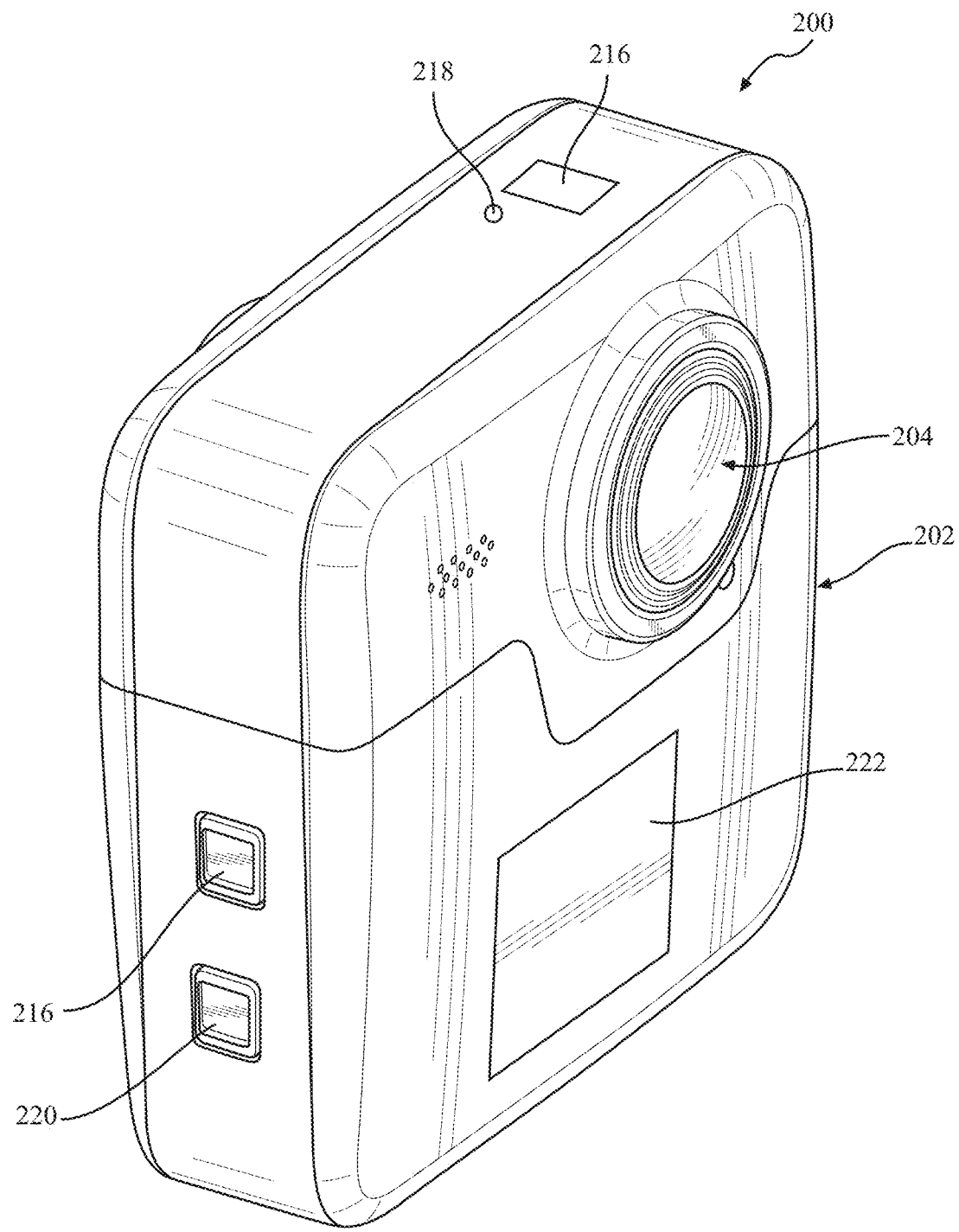

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
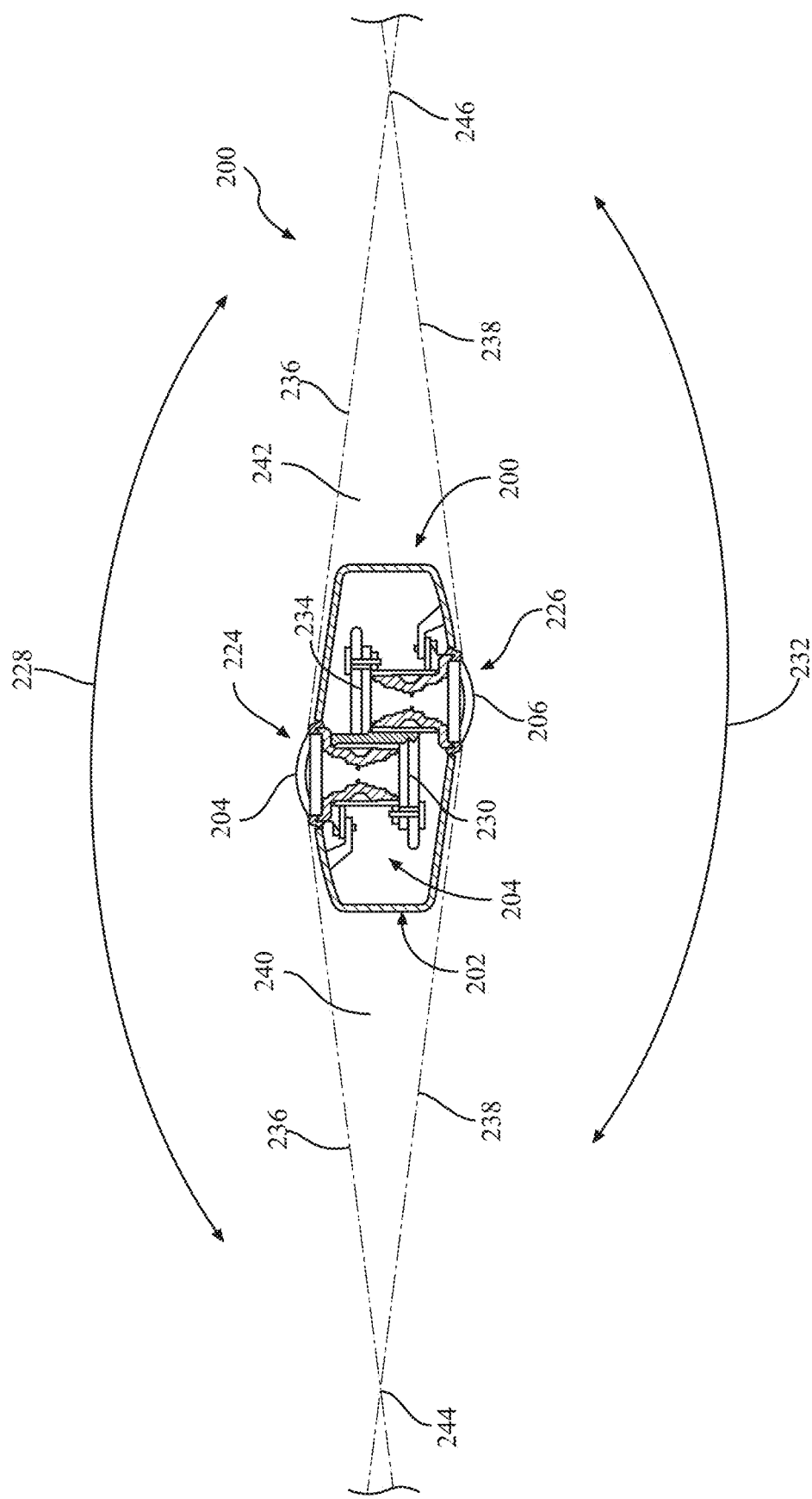
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-C. The personal computing device 360 may, for example, be the user interface device described with respect to FIGS. 1A-C.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

Figure 4A:
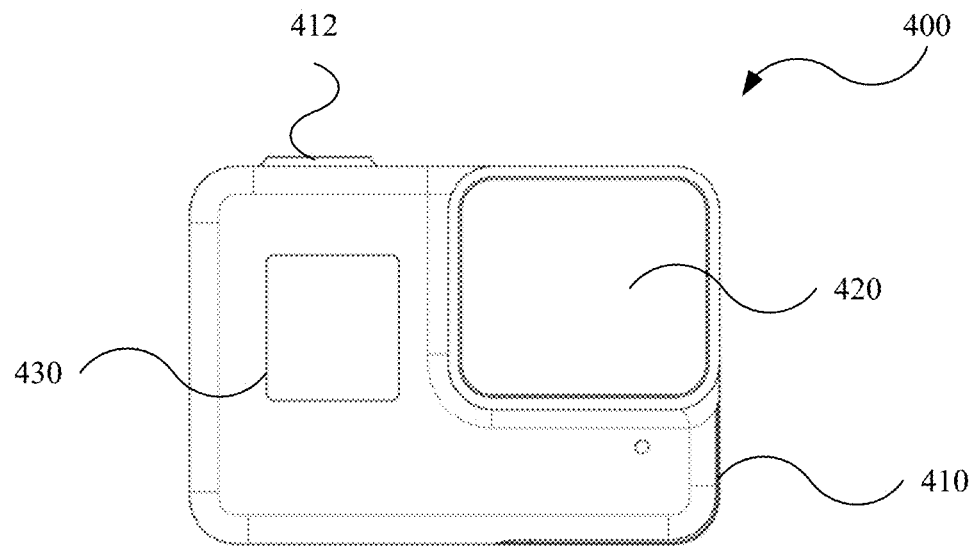
FIG. 4A is a front view of a camera.
Figure 4B:
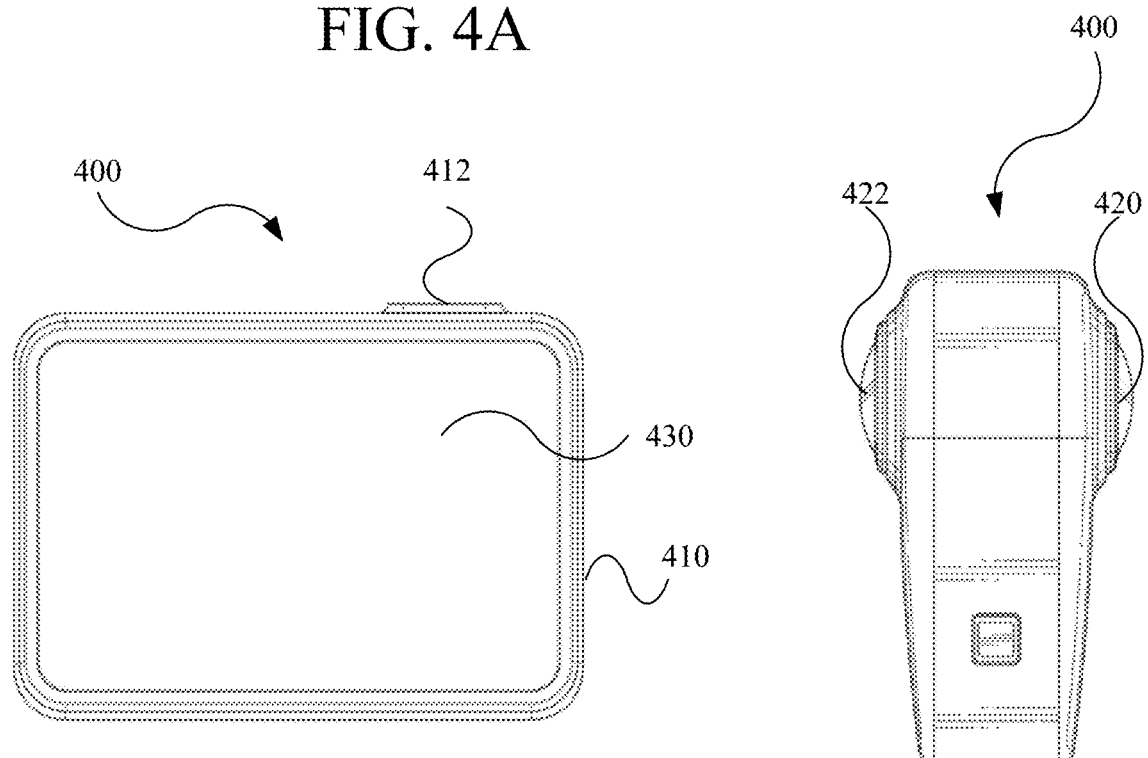
FIG. 4B is a rear view of the camera of FIG. 4A.

Referring to FIGS. 4A and 4B, a camera 400 is a variation of the image capture device 100 and generally includes a body 410, one or more lenses 420, and one or more displays 430. The body 410 contains various electronics (e.g., image sensors; discussed below) and includes one or more physical buttons 412 for receiving user inputs, such as for starting a recording (e.g., a shutter button). The one or more lenses 420 are cooperatively configured with one or more corresponding image sensors to capture images stored as a video recording. The displays 430 are configured to provide information to the user, such as with a graphical user interface, and may also display images of an image stream of video being recorded by the camera 400.

Figure 4C:
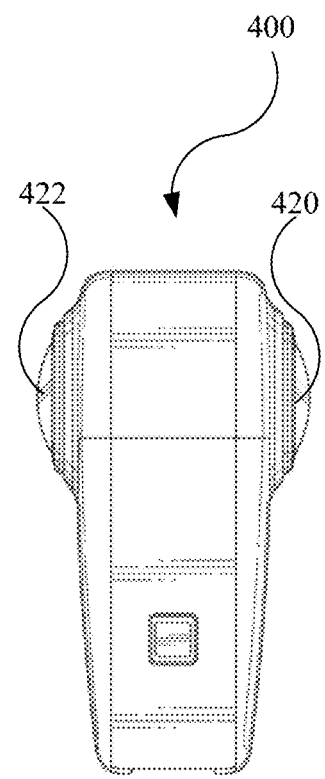
FIG. 4C is a side view of another embodiment of a camera.

As shown in FIGS. 4A-4B, the camera 400 includes one of the lenses 420 but may include one or more additional lenses and corresponding images sensors (e.g., facing opposite directions with overlapping fields of view to form a spherical camera; see FIG. 4C, which is a variation of the image capture device 200). The camera 400 may further include two of the displays 430 with one of the displays 430 being coupled to a first side of the body 410 to which the lens 420 is coupled and the other of the displays 430 being coupled to the second side of the body 410 opposite the lens 420. One of the displays 430 is, for example, a display screen of high resolution (e.g., 360×540 pixels), such as a liquid crystal display (LCD), for displaying live images of the image sensor to the user along with various information of the graphical user interface. The other of the displays 430 may be smaller, of lower resolution, and/or of a different type for providing other information to the user (e.g., elapsed time in a numerical manner). The camera 400 may instead include only one display 430 (e.g., on the second side of the body 410 opposite the lens 420).

Figure 5:
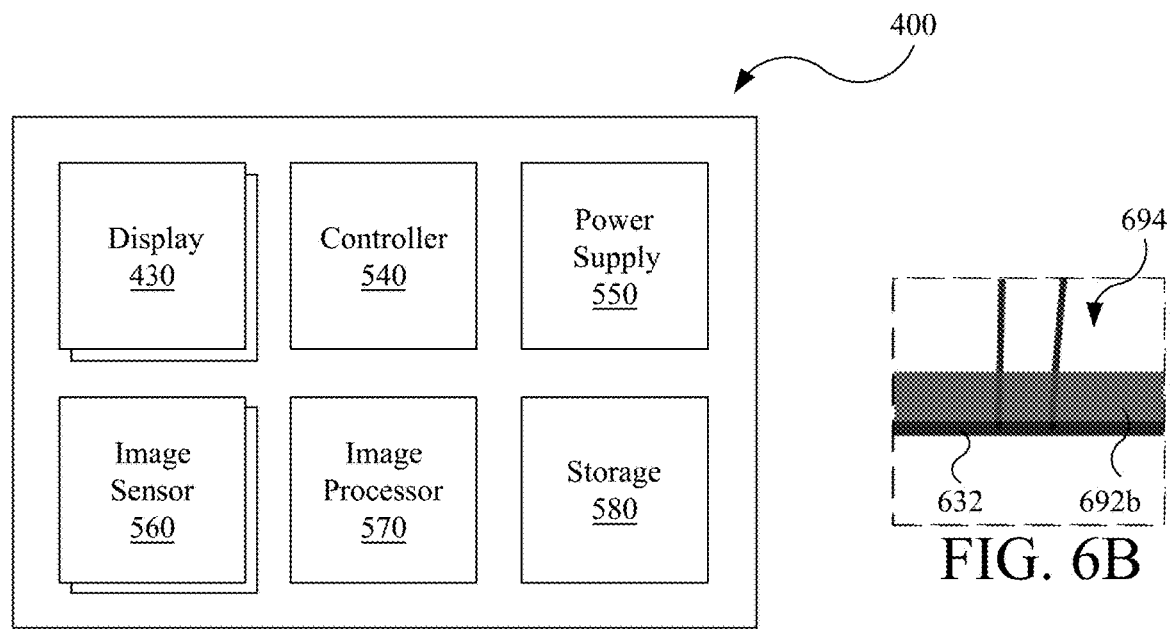
FIG. 5 is a schematic of electronic components of the cameras of FIGS. 4A and 4C.

Referring to FIG. 5, the camera 400 is, for example, a digital camera that includes suitable electronics within the body 410 to capture video. The electronics are depicted schematically and may include the displays 430, a controller 540, a power supply 550, one or more image sensors 560, an image processor 570, and a storage 580. The controller 540 may be any suitable computing device (e.g., having a processor, a memory, and suitable communications interfaces) for executing software instructions, for example, to operate the display 430 to provide a graphical user interface and to operate the image sensor 560 and image processor 570 to record video. The image sensors 560 and the image processor 570 may be of any suitable type for recording video to be stored in the storage 580. The video may be stored in any suitable encoding format (e.g., MPEG-4). In the case of the camera 400 including the second lens 422 (e.g., being configured as the spherical camera), the electronics may include multiple image sensors 560. The power supply 550, such as a battery, provides electrical power for operating the various electronics. The camera 100, instead or additionally, include those electronic components and/or the entire hardware configurations described with respect to the image capture device 300.

Figure 6B:
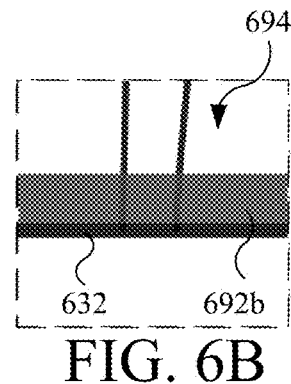
FIG. 6B is a detail view taken from box 6B-6B in FIG. 6A.
Figure 6A:
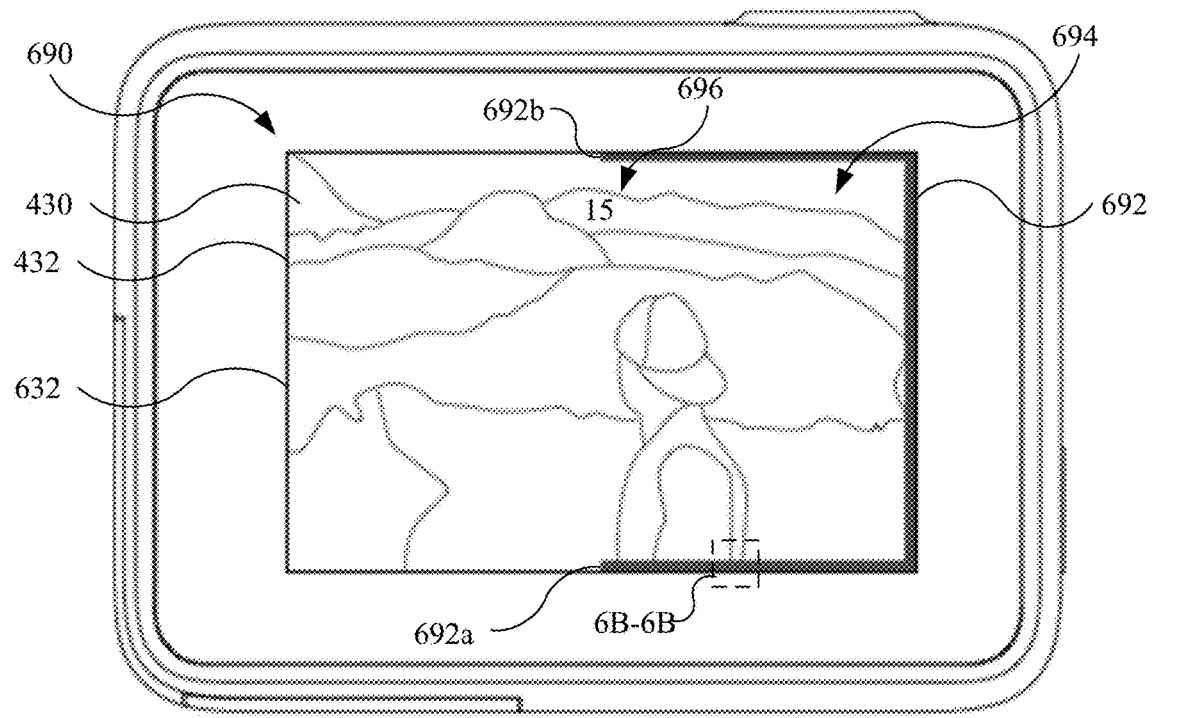
FIG. 6A is a plan view of a display of the camera having a first embodiment of a graphical user interface.

Referring to FIG. 6A, one, or both, of the displays 430 is configured to display a graphical user interface 690 to the user, such as the display 430 opposite the lens 420.

As referenced above, the camera 400 may be operated to record video for one or more predetermined recording durations (e.g., 15 seconds, 30 seconds, or other suitable time limit or fixed duration as determined by the user or another, such as a third-party service). While recording video segments during the predetermined recording duration, the graphical user interface 690 includes a graphical indicator 692 that provides a non-numerical visual indication of time elapsed during the current recording, which may be referred to as the elapsed time indicator 692 or an elapsed time graphic 692. The graphical user interface 690 may further include an image stream 694, which displays live images being captured contemporaneously by the one or more image sensors 560. The graphical user interface 690 may further include a numerical indicator 696 that provides a numerical indication of time remaining of the recording (as shown), the time elapsed, and/or the predetermined recording duration. The graphical user interface 690 may include still further graphical elements, such as other indicators and/or interactive elements (e.g., touch elements for the user to control operation of the camera 400).

As shown in FIGS. 6A-7G, the elapsed time indicator 692 lengthens as time elapses to form a border around the image stream 694 and/or around an outer periphery 632 of the display 430. During a recording of the predetermined duration, the elapsed time indicator 692 increases in size (e.g., lengthens) to a completed length of the border that corresponds to the predetermined recording duration. The elapsed time indicator 692 increases in size proportionally to the time elapsed of the recording, such that a ratio of the size of the elapsed time indicator to the completed size is equal to a ratio of the time elapsed to the predetermined duration. For example, as shown in FIGS. 6A and 7D, for a predetermined recording duration of 30 seconds, the elapsed time indicator 692 forms the border that extends approximately 50% of the length around the image stream 694 to represent 15 seconds of time elapsed. The completed length of the border may extend entirely or substantially entirely around the display 430 and/or the image stream 694, or another suitable distance. By forming a border of the image stream 694, the elapsed time indicator 692 may be positioned outside of and proximate to the image stream 694 (e.g., at adjacent pixels) or may overlay one or more edges of the image stream 694 (e.g., having common outer dimensions). By forming a border of the display 430, the elapsed time indicator 692 may be displayed by pixels along the edges of the display 430 (e.g., the outermost pixels, so as to have common outer dimensions). The border may extend around the display 430 and/or the image stream 694 (e.g., entirely or substantially entirely, such as within 90%, 95%, or 99% of a length of the outer periphery 632 thereof).

As referenced above, the elapsed time indicator 692 changes in size proportionally to the time elapsed. Changes to the size of the elapsed time indicator 692 may be proportional to the time elapsed based on a change in length thereof, as shown (e.g., increasing in length, for example, measured by pixels substantially equally for each time increment). Alternatively, the changes to the size of the elapsed time indicator 692 may be based on angular position (e.g., increasing in angular position relative to a center of the image stream 694 substantially equally for each time increment). If the image stream 694 and/or the display 430 is non-circular (e.g., rectangular, as shown, or square), the fixed changes in length and angle may not correspond to each other for a given time change.

Figure 7A:
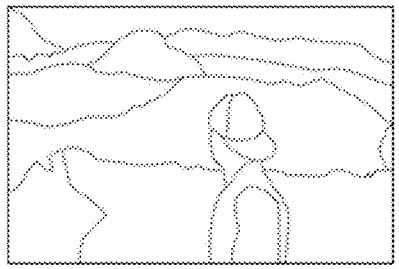
FIGS. 7A-7G are plan views of the display with first through seventh animated images of the graphical user interface in a landscape orientation.
Figure 7B:
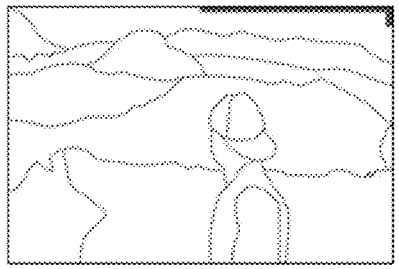
Figure 7C:
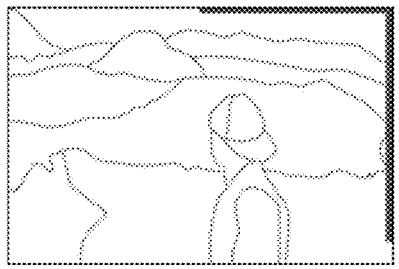
Figure 7D:
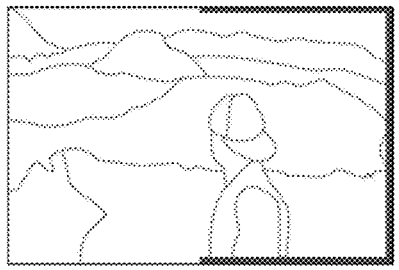
Figure 7E:
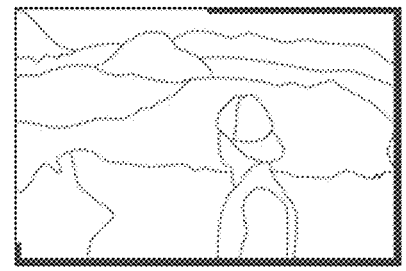
Figure 7F:
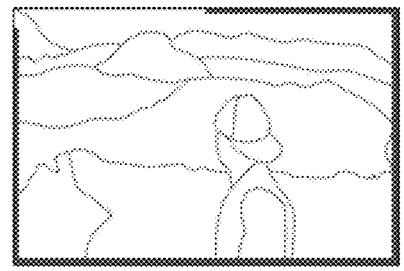

FIGS. 7A-7G illustrate a sequence of image frames of the graphical user interface 690 over the predetermined duration. FIG. 7A illustrates a first image frame at a recording start time Tstart (i.e., Tstart=0 seconds) in which the elapsed time indicator 692 is not shown to indicate that no time of the predetermined recording duration has elapsed. The time remaining (e.g., 30 seconds, as shown), the time elapsed (i.e., 0 seconds), and/or the predetermined recording duration (e.g., 30 seconds) may be indicated by the numerical indicator 696.

Figure 7G:
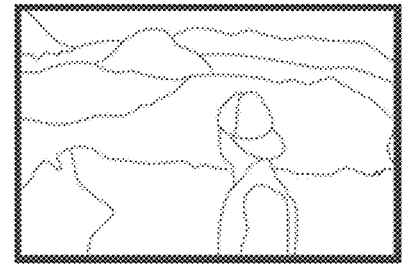
Figure 8A:
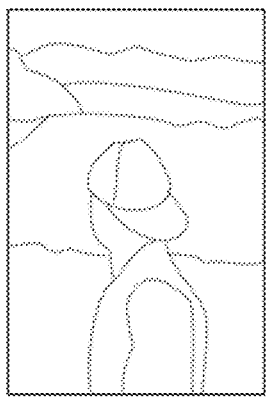
FIGS. 8A-8G are plan views of the display with first through seventh animated images of the graphical user interface in a landscape orientation.
Figure 8D:
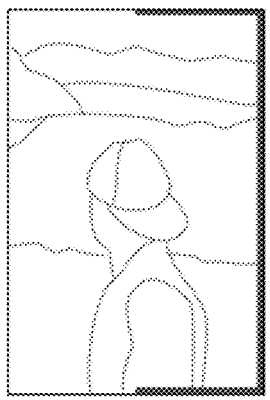
Figure 8G:
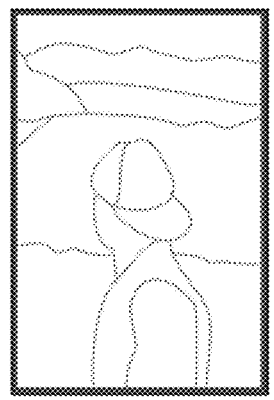
Figure 8B:
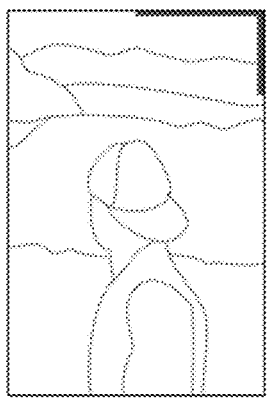
Figure 8E:
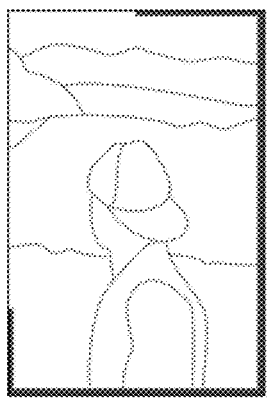
Figure 8C:
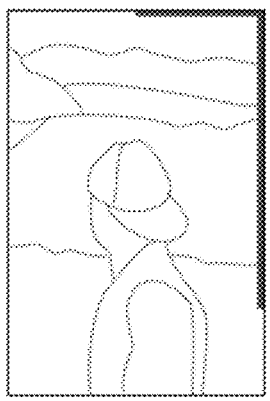
Figure 8F:
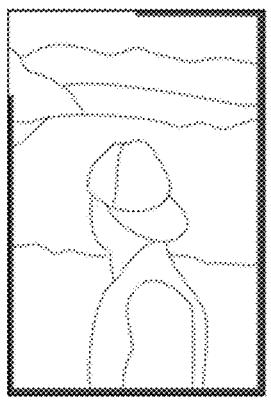

FIG. 7G illustrates an end image frame at a recording end time Tend (i.e., Tend=predetermined recording duration, such as 30 seconds) in which the elapsed time indicator 692 is shown and forms the entirety of the border to visually indicate that the entirety of the predetermined recording duration has elapsed. The time remaining (i.e., 0 seconds, as shown), the time elapsed (i.e., 30 seconds), and/or the predetermined recording duration (e.g., 30 seconds) may be indicated by the numerical indicator 696.

FIGS. 7B-7F illustrate intermediate image frames of the graphical user interface 690 time at intervals between the recording start time Tstart and the recording end time Tend (e.g., T1, T2, T3, T4, T5=5, 10, 15, 20, and 25 seconds, respectively, for example). In the intermediate image frames, the elapsed time indicator 692 increases in size (e.g., length) proportionally to the time elapsed and time remaining of the recording, such that the elapsed time indicator 692 is animated. The time remaining (e.g., 25, 20, 15, 10, and 5 seconds), the time elapsed (e.g., 5, 10, 15, 20, 25 seconds), and/or the predetermined recording duration (e.g., 30 seconds) may be indicated by the numerical indicator 696 (see FIG. 6A).

While the seven image frames are shown in FIGS. 7A-7G for illustration purposes of the recording start time Tstart to the recording end time Tend, it should be understood that more image frames may be provided, for example, changing from frame-to-frame according to a suitable frequency (e.g., 1, 2, 5, 10, 12 Hz, more or less), period (e.g., every 0.1, 0.5, 1 second, more or less), and/or size change of the remaining time indicator 692 (e.g., 1, 2, 5 pixels, more or less; 0.1%, 0.5%, 1%, 2% of border length).

Having the elapsed time indicator 692 form a border around the image stream 694 and/or around the display 430 may provide various benefits to the user. For example, the elapsed time indicator 692 being at the outer periphery of the image stream 694 does not overlay central portions of the image stream 694 that are more likely to include subjects of interest of the video being recorded. Furthermore, size (e.g., length) of the elapsed time indicator 692 is significantly longer than any single dimension of the image stream 694 and/or the display 430 (e.g., being the sum of two times a width and two times a height thereof), such that the user is provided with a high degree of granularity (e.g., large incremental changes of size to the elapsed time indicator 692 representing relatively small amounts of time elapsed).

The elapsed time indicator 692, as referenced above, provides a non-numerical indicator to the user of the time elapsed and/or the time remaining. Being non-numerical may be beneficial by allowing the user to discern the time elapsed and/or the time remaining of the recording without having to visually focus on and discern the numerical indicator 696 of the time elapsed, the time remaining, or changes therein. For example, the user may generally visually recognize changes in length of the elapsed time indicator 692, while focusing on the image stream 694 to roughly discern changes in time elapsed. The numerical indicator 696 may allow the user to more precisely determine elapsed time from one point to another but requires the user to visually focus to read the numerical indicator and perform a specific calculation.

The elapsed time indicator 692 may be configured in various manners, including visual contrast, size, orientation relative to the display 430, and/or orientation relative to the image stream 694, which may provide functional benefits, as well as aesthetically pleasing appearance.

The elapsed time indicator 692 contrasts with the image stream 694 and/or with the body 410 surrounding the display 430, so as to be visually discernable by the user. For example, the elapsed time indicator 692 may have a color (e.g., red). As illustrated in the detail view of FIG. 6B, the elapsed time indicator 692 may also be semi-opaque (e.g., 80% opacity) and overlay the image stream 694. As a result, the elapsed time indicator 692 may function as a localized filter (i.e., in the border region) that overlays and allows the image stream 694 to be viewed thereunder, while shading with color the image stream 694 (e.g., red) and/or obscuring the image stream 694 thereunder (e.g., 80% opacity). Furthermore, the color of the elapsed time indicator 692 may be different for different predetermined intervals (e.g., blue for 15 seconds and red for 30 seconds). The elapsed time indicator 692 may be of any other suitable color and/or opacity (e.g., being transparent to fully opaque).

Figure 9A:
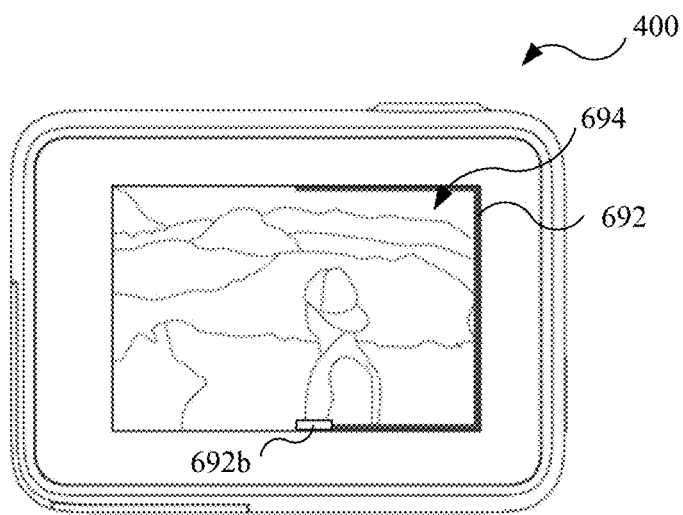
FIG. 9A is a variation of the graphical user interface of FIG. 6A.

Referring to FIG. 9A, the elapsed time indicator 692 may further include a leading end 692a that is different from the remainder of the elapsed time indicator 692. For example, the leading end 692a may have a different brightness, color, opacity (e.g., being opaque), consistency (e.g., flashing), and/or shape (e.g., being wider) so as to be more discernable from the image stream 694 than trailing portions of the elapsed time indicator 692.

Figure 9B:
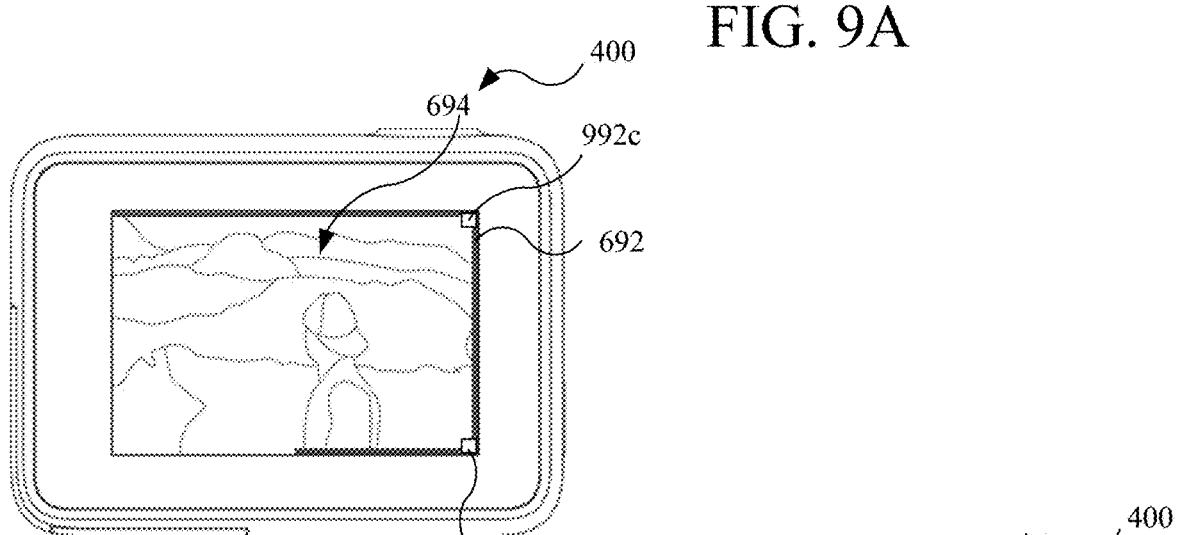
FIG. 9B is another variation of the graphical user interface of FIG. 6A.

The elapsed time indicator 692 may, in addition to forming the border, change appearance in other manners to indicate the passage of time. For example, the elapsed time indicator 692 may abruptly change direction (e.g., at corners of the display 430) to indicate passage of different amounts of time. Referring to FIG. 9B, the starting position 692b of the elapsed time indicator 692 may originate adjacent one corner of the display 430 (e.g., the upper left corner) and/or the image stream 694, while abrupt 90 degree changes of direction at each corner thereof may indicate that a certain portion or increment of the predetermined recording duration has elapsed (e.g., 25% thereof). Still referring to FIG. 9B, instead or additionally, the elapsed time indicator 692 may include visual increment markers 992c that are visually distinct from other portions of the elapsed time indicator 692 to indicate a certain portion of the predetermined recording duration thereof has elapsed. For example, the visual increment markers 992c may be of a different color and/or opacity (e.g., being more discernable) than other portions of the elapsed time indicator 692 therebetween or thereafter and, for example, may be located at corners of the display 430 and/or the image stream 694 (e.g., representing 25% time portion or increment).

The elapsed time indicator 692 may also change appearance upon reaching a remaining time threshold to indicate an amount of remaining time, which may be an absolute value (e.g., 3 or 5 seconds) irrespective of the predetermined recording duration or a relative value of the predetermined recording duration (e.g., 10% or 25% thereof). For example, the elapsed time indicator 692 or a portion thereof (e.g., the leading end 692a) may change color, brighten, and/or flash upon the remaining time reaching the remaining time threshold.

The border formed by the elapsed time indicator 692 has a small width relative the width and/or height of the display 430. For example, the border may have a width, which may be measured extending inward from the outer periphery 432 of the display 430, that is less than 10% (e.g., less than 5%, less than 3%) of a maximum dimension of the display 430 (e.g., width as shown). Changes to the appearance of the border may, thereby, be noticeable to the user to discern the time elapsed (or time remaining), while being relatively unobtrusive to other functions of the display 430 (e.g., displaying the image stream 694).

As shown, the elapsed time indicator 692 may be oriented relative to the image stream 694 and/or the display 430 to originate from a start position 692b of the elapsed time indicator, which is centered left-to-right along an upper end thereof. As time elapses, the elapsed time indicator 692 increases in size moving along the outer periphery 432 of the display 430 and/or edges of the image stream 694.

As shown, both the display 430 and the image stream 694 are rectangular, each having a short dimension with opposed short edges and a long dimension with opposed long edges. The display 430 and the image stream 694 may be arranged in a landscape orientation (as shown in FIGS. 6A-7G), such that one of the long edges of the display 430 and/or the image stream 694 form the upper end along which the start position 692b of the elapsed time indicator is centered left-to-right.

The image stream 694 may instead be arranged in a portrait orientation relative to the display 430 (as shown in FIGS. 8A-8G), such that one of the short edges of the display 430 and/or the image stream 694 form the upper end along which the start position 692b of the elapsed time indicator is centered left-to-right.

The camera 400 may be configured to change between the landscape orientation and the portrait orientation, for example, upon selection by the user and/or automatically by detection of a change of a physical orientation of the camera 400.

As shown in FIGS. 6A-8G, the image stream 694 and the display 430 may be dimensionally the same, such that the image stream 694 fills an entirety of the area of the display 430. For example, the image stream 694 and the display 430 may each have the same aspect ratio of the long dimension to the short dimension (e.g., 3:2, such as 960 pixels by 640 pixels). With the image stream 694 and the display 430 being dimensionally the same, the border formed by the elapsed time indicator 692 may extend along both long edges and both short edges of both the image stream 694 and the display 430. The aspect ratio of the image stream 694 may, or may not, match the aspect ratio of images captured for the video recording.

Figure 9C:
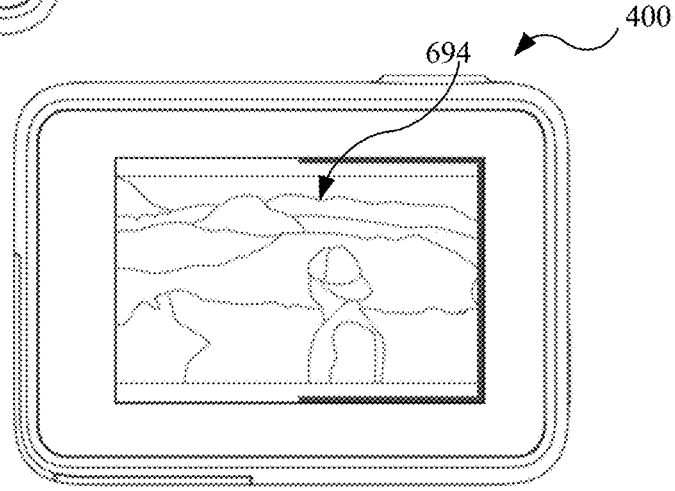
FIG. 9C is another variation of the graphical user interface of FIG. 6A.
Figure 9D:
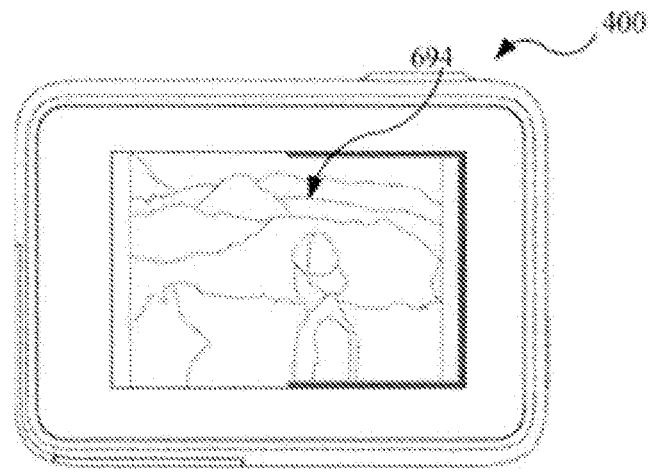
FIG. 9D is another variation of the graphical user interface of FIG. 6A.

As shown in FIGS. 9C-9D, the image stream 694 and the display 430 may be dimensionally different (e.g., having different aspect ratios), such that the image stream 694 partially fills the area of the display 430.

As shown in FIG. 9C, the image stream 694 may have an aspect ratio (e.g., 16:9) that is larger than the display 430 (e.g., 3:2). In such case, long dimensions of the image stream 694 and the display 430 may be the same. The short edges of the image stream 694 and the display 430 coincide with each other, while one or both of the long edges of the image stream 694 are spaced inward from the long edges of the display 430 (e.g., biasing the image stream 694 toward one of the long edges, or centering the image stream 694 on the display 430, as shown). With the image stream 694 having a larger aspect ratio than the display 430, the elapsed time indicator 692 may form the border to extend along the short edges of the image stream 694, while being spaced outward from one or both of the long edges thereof, whether in the landscape orientation or the portrait orientation As shown in FIG. 9D, the image stream 694 may have an aspect ratio (e.g., 4:3) that is smaller than the display 430 (e.g., 3:2). In such case, short dimensions of the image stream 694 and the display 430 may be the same, such that the long edges of the image stream 694 and the display 430 coincide with each other, while one or both of the short edges of the image stream 694 are spaced inward from the short edges of the display 430 (e.g., biasing the image stream 694 toward one of the short edges, or centering the image stream 694 on the display 430, as shown). With the image stream 694 having a smaller aspect ratio than the display 430, the elapsed time indicator 692 may form the border to extend along the long edges of the image stream 694, while being spaced outward from one or both of the short edges thereof, whether in the landscape orientation or the portrait orientation.

The camera 400 may be configured to change the aspect ratio of the image stream 694 (e.g., based on user selection of an aspect ratio or image format) and, thereby, the position of the elapsed time indicator 692 relative to edges the image stream 694.

Figure 10:
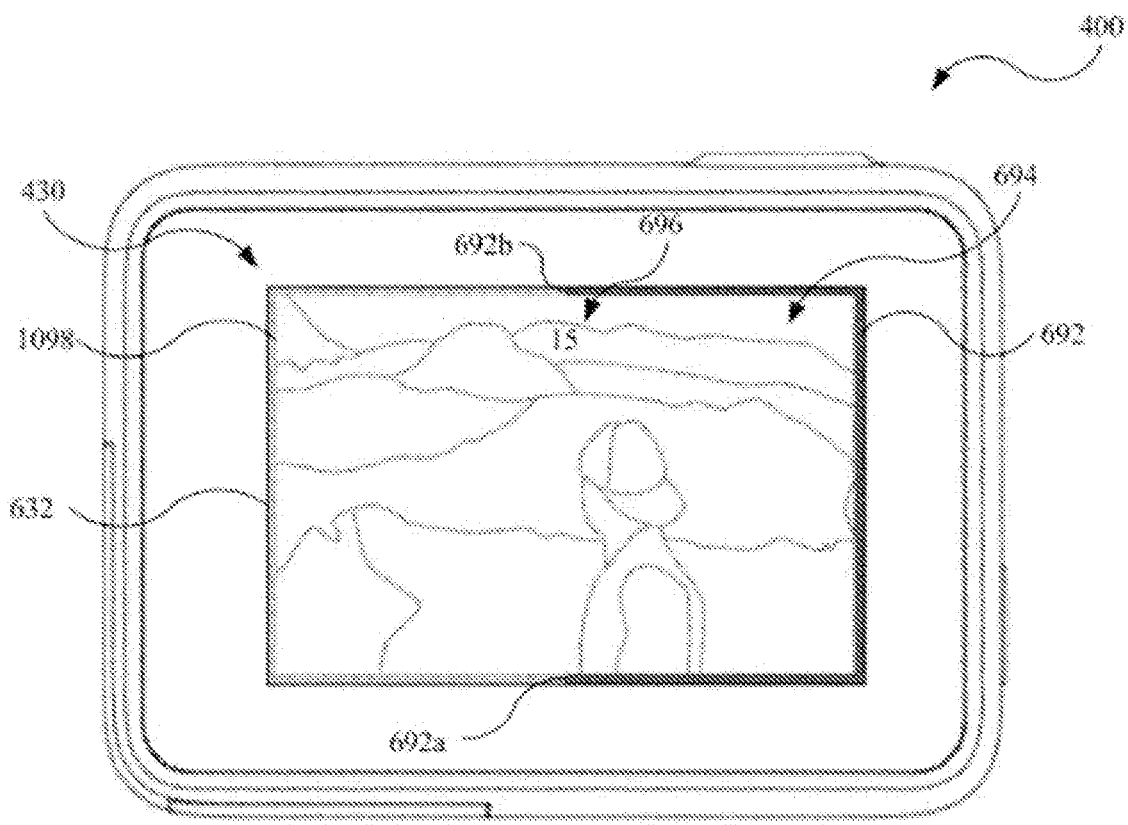
FIG. 10 is another variation of the graphical user interface of FIG. 6A.

Referring to FIG. 10, the graphical user interface 690 may further include a second graphical indicator 1098 that provides a non-numerical visual indication of time remaining of the predetermined recording duration, which may be referred to as a remaining time indicator 1098 or a remaining time graphic 1098. The remaining time indicator 1098 is configured with the elapsed time indicator 692 to cooperatively form the completed length of the border around the image stream 694 and/or the display 430. The remaining time indicator 1098 extends from the leading end 692a of the elapsed time indicator 692. For example, as shown, the elapsed time indicator 692 may extend 50% of the distance around the image stream 694 and/or the display 430 (e.g., reflecting 50% of the predetermined duration having elapsed, such as 15 of 30 seconds), while the remaining time indicator 1098 extends the remaining 50% of the distance (e.g., reflecting 50% of the predetermined duration remaining, such as 15 of 30 seconds). A sum of the sizes (e.g., lengths) of the elapsed time indicator 692 and the remaining time indicator 1098 may be constant (e.g., equaling the completed length of the border), such that decreases in the size (e.g., shortening) of the remaining time indicator 1098 are equal to contemporaneous increases in the size of the elapsed time indicator 692 (e.g., lengthening). For example, the elapsed time indicator 692 may have the appearance of filling the area of the remaining time indicator 1098.

The remaining time indicator 1098 contrasts with the image stream 694 and/or with the body 410 surrounding the display 430, so as to be visually discernable by the user. For example, the elapsed time indicator 692 may have a color (e.g., white), which may function as a localized filter (e.g., as the border) that overlays and allows the image stream 694 to be viewed thereunder. The remaining time indicator 1098 may also be semi-opaque by having an opacity that obscures the image stream 694 thereunder. Alternatively, the remaining time indicator 1098 may be opaque in which case the image stream 694 thereunder is not visible, or the image stream 694 is dimensionally smaller than the remaining time indicator 1098.

The elapsed time indicator 692 and the remaining time indicator 1098 visually contrast with each other, for example, being different in color and/or opacity. For example, the elapsed time indicator 692 may be of a darker and/or more vibrant color than the remaining time indicator 1098 and, thereby, be more easily recognizable by the user to discern the time elapsed (or vice versa). In one example, the elapsed time indicator 692 is a dark shade of red, while the remaining time indicator 1098 is white or a light shade of gray. The elapsed time indicator 692 may, instead or additionally, be more opaque than the remaining time indicator 1098 (or vice versa).

In one example, the border includes a fixed first layer having a first color (e.g., white) and a first opacity (e.g., 40%), which extends around the display 430 and/or the image stream 694, and a moving second layer having a second color (e.g., red) and a second opacity (e.g., 80%) that moves through the border as time elapsed. The fixed first layer overlays the image stream 694 and the moving second layer overlays both the image stream 694 and the fixed first layer. The fixed first layer, where not overlaid by the moving second layer, forms the remaining time indicator 1098 (i.e., with the color and the opacity of only the first layer). The fixed first layer and moving second layer, where overlaying the fixed first layer, cooperatively form the elapsed time indicator 692 (i.e., with the color and opacity of the first and second layers).

Figure 11:
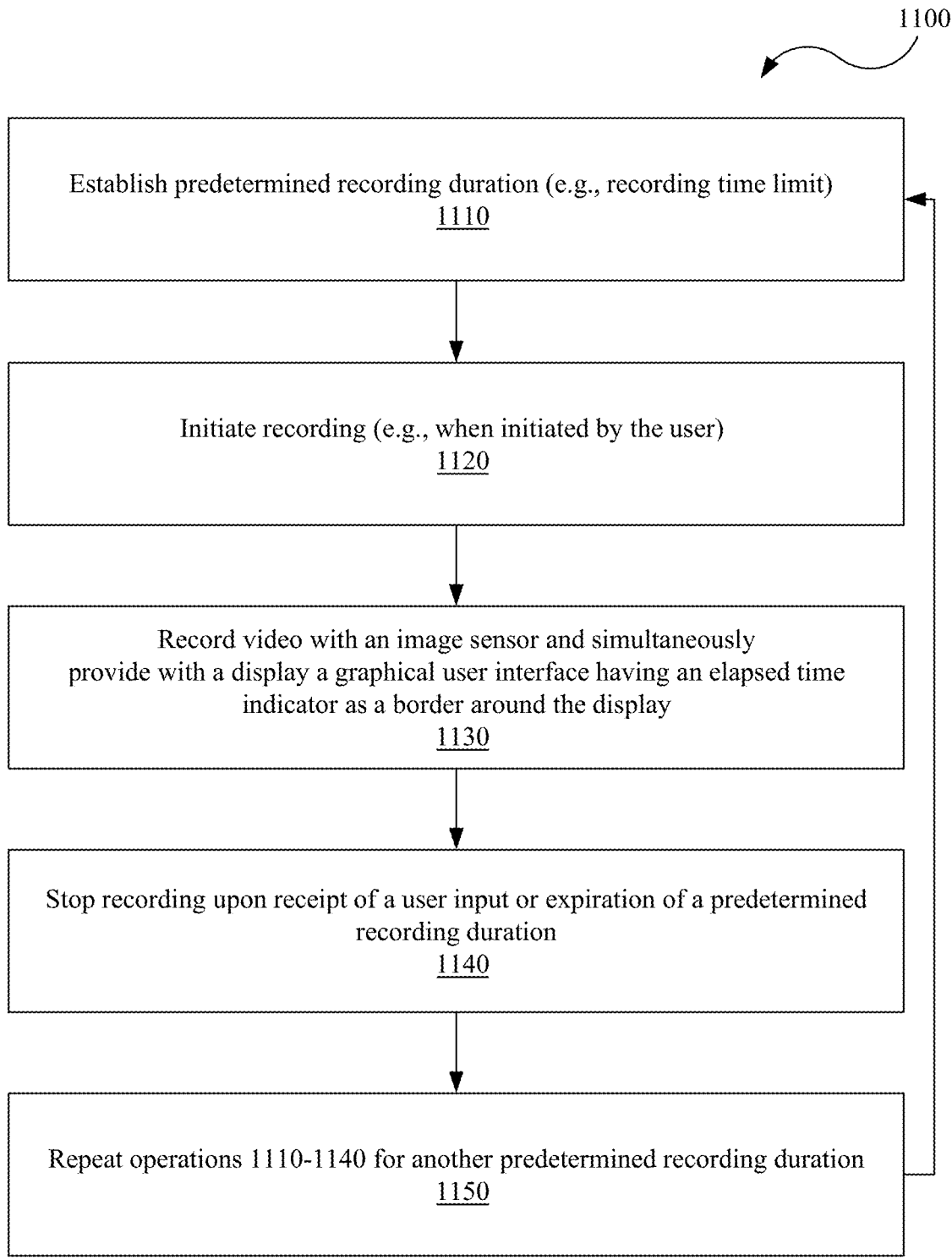
FIG. 11 is a flow diagram of a method for recording a video.

Referring to FIG. 11, the camera 400 is operated to record a video according to a predetermined recording duration (e.g., a predetermined time limit). Prior to initiating the recording, the predetermined recording duration is established. For example, the user may select a particular mode (e.g., a clips mode) of which the predetermined recording duration is a predetermined or using-defined setting. In another example, the user may select or change the predetermined recording duration from one of multiple predetermined options (e.g., no limit, 15, 30, and 60 seconds), which are selectable (e.g., changeable) from one or more menus presented to the user. The user selection of the mode or the predetermined recording duration may be received by the camera 400 from a user input, such as the display 430 (e.g., functioning as a touch sensitive display), the physical buttons 412, with voice commands (e.g., being received by a microphone of the camera 400), and/or from a separate control device (e.g., a remote control or smartphone in communication with the camera 400).

The recording is initiated by an input received by the camera 400 from the user. For example, the physical button 412 may function as a user input component of the camera 400, which may be pressed by the user to provide the input received by the camera 400 to initiate the recording. The button 412 may subsequently (e.g., immediately) be released by the user, while the recording continues until stopped (e.g., the button 412 does not need to be held for the recording to continue). The recording stops, for example, upon the predetermined recording duration elapsing or the user stopping the recording by pressing the physical button 412 again prior to the predetermined recording duration elapsing. Other components of or associated with the camera 400 may function to receive the user input for initiating the recording, such as a microphone (e.g., for receiving voice inputs) and/or an external device (e.g., a remote control or smartphone device in communication with the camera 400).

While recording, the graphical user interface 690 is provided to the user. The controller 540 causes one or more of the displays 430 (e.g., the primary display screen) to provide the graphical user interface to the user. The graphical user interface 690 includes the elapsed time indicator 692, which is displayed as a border on the display 430. The graphical user interface may also display the numerical indicator 696, the image stream 694, and/or the remaining time indicator 1098. The elapsed time indicator 692 is configured as described above to increase in size (e.g., length) to form the border around the display 430 and/or the image stream 694 to contrast with the image stream 694 (e.g., by overlaying the image stream 694 as a filter).

The recording is stopped upon completion of the predetermined time duration (i.e., the elapsed time equals the predetermined recording duration; the remaining time equals zero). Instead or additionally, the recording may be stopped upon receiving an input from the user prior to completion of the predetermined duration (e.g., the user pressing the physical button 412 and/or providing input via another device, such as a remote controller or a smartphone). That is, recording is stopped when the shorter of the elapsed time equals the predetermined recording duration or the recording is stopped by a user.

Still referring to FIG. 11, a method 1100 is provided for recording video. The method 1100 generally includes a first operation 1110 of establishing a predetermined recording duration, a second operation 1120 of initiating a video recording, a third operation 1130 of recording video and simultaneously displaying a graphical user interface having a time elapsed indicator, a fourth operation 1140 of stopping the video recording. The method 1100 may further include a fifth operation 1150 of repeating the operations 1100-1140 for a different predetermined recording duration.

The first operation 1110 of establishing the predetermined recording duration is performed, for example, by using a default value, receiving a user input of a recording mode having a predetermined recording duration associated therewith, or receiving a user input, such as from a menu selection or a custom numerical input. The user input is received with a user input device of the camera 400, such as a physical button 412, the display 430 as a touch sensitive display, a microphone receiving a voice command, or an external device in communication therewith, such as a dedicated remote controller or a smartphone. The predetermined recording duration is stored, for example, by the controller 540. The predetermined recording duration is, for example, a time limit for the video recording.

The second operation 1120 of initiating the recording is performed upon receipt of a user input by an input device of the camera 400 (e.g., the physical button 412, such as a shutter button) or a device associated with the camera 400 (e.g., a dedicated remote control device or a smartphone in communication therewith).

The third operation 1130 of recording the video and simultaneously providing the graphical user interface 690 with the elapsed time indicator is performed subsequent to the second operation and may be controlled, for example, by the controller 540. The image sensor 560, the image processor 570, and the storage 580 are cooperatively operated, such as by the controller 540, to record successive images that form the video recording. The video recording is stored in any suitable format, such as MPEG-4.

Simultaneous to recording the video, the display 430 is further operated, for example, by the controller 540 to display the elapsed time indicator 692. The elapsed time indicator 692, as described above, forms a border that extends around the display 430, increasing in length proportionally to the time elapsed, as described above. The graphical user interface 690 may further include the image stream 694, which includes live images being recorded as part of the image stream. The graphical interface may also include the numerical indicator 696, for example, of remaining time of the recoding. The graphical user interface 690 may still further include the remaining time indicator 1098, which cooperatively forms the border extending around the display 430 and which reduces in size proportionally to the time elapsed. The elapsed time indicator 692, the image stream 694, the numerical indicator 696, and the remaining time indicator 1098 may be configured as described above.

The third operation 1130 may further include providing another graphical user interface with another time elapsed indicator on another display (e.g., on an opposite side of the body 410 of the camera 400 from the display 430), which may include providing the elapsed time indicator 692 in a suitable format for the other display 430 (e.g., at a lower resolution).

The fourth operation 1140 of stopping the recording is performed upon completion of the predetermined recording duration (i.e., when the elapsed time equals the predetermined recording duration, and when the remaining time equals zero) or upon receipt of a user input prior to completion of the predetermined recording duration. The user input may be received, for example, in the same manner that the recording was initiated in the first operation (e.g., via the physical button 412, voice command, and/or an external device in communication with the camera 400). The video recording may be stopped, for example, by the controller 540 operating the image sensor 560, the image processor 570, and/or the storage 580.

In a fifth operation 1150, the first through fourth operations 1110 to 1140 are repeated to record a second video recording. The first operation 1110 of establishing the predetermined recording duration may be performed, for example, by using the previously established predetermined recording duration or by receiving a new user input of a different predetermined recording duration. If a new user input is received establishing a different predetermined recoding duration, the border formed by the elapsed time indicator may have the same completed length for different predetermined recording durations but may increase in length at a different rate (i.e., slower for longer predetermined recording durations, and faster for slower predetermined recording durations).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A camera comprising:
   an image sensor;
   a display; and
   a controller that operates the image sensor to record a video recording and that operates the display to display an image stream and a graphical user interface having an elapsed time indicator on the display,
   wherein the elapsed time indicator increases in length as time elapses to form a border around the display, wherein the border is only formed as time elapses,
   wherein the elapsed time indicator overlays the image stream and is semi-opaque so that the image stream is viewable under the elapsed time indicator, and
   wherein the elapsed time indicator includes a leading end and the leading end has a different brightness, opacity, consistency, and/or shape than a trailing portion of the elapsed time indicator.

2. The camera according to claim 1, wherein the elapsed time indicator increases to a completed length corresponding to a predetermined recording duration.

3. The camera according to claim 2, wherein a ratio of a length of the elapsed time indicator to the completed length is equal to another ratio of the time elapsed of the video recording to the predetermined duration.

4. The camera according to claim 3, further comprising a remaining time indicator that cooperatively forms the completed length of the border with the elapsed time indicator, wherein as the elapsed time indicator increases in length, the remaining time indicator equally decreases in length.

5. The camera according to claim 1, wherein the elapsed time indicator increases in length until a shorter of the elapsed time equals a predetermined recording duration or the recording is stopped by a user;
  wherein the elapsed time indicator forms a completed length of the border around the display when the elapsed time equals the predetermined recording duration, and wherein the border has a completed length that is substantially equal to a length of an outer periphery of the display, and
  wherein the border and the display have common outer dimensions.

6. The camera according to claim 1, further comprising a second display that displays another graphical interface having another elapsed time indicator, wherein the other elapsed time indicator increases in length as the time elapses to form another border around the second display.

7. The camera according to claim 6, wherein the display and the second display face opposite directions and the second display has a lower resolution then the display.

8. The camera according to claim 1, wherein elapsed time indicator has a color that contrasts with the image stream of the graphical user interface.

9. The camera according to claim 8, wherein the graphical user interface includes a remaining time indicator that completes the border around the display, has another color that is different from the color of the elapsed time indicator, overlays the image stream, and is semi-opaque.

10. The camera according to claim 1, wherein the elapsed time indicator changes appearance upon reaching a remaining time threshold to indicate an amount of time remaining.

11. The camera according to claim 10, wherein the change in appearance upon reaching the remaining time threshold is irrespective of a predetermined recording duration or a relative value of the predetermined recording duration, and wherein the change in appearance is a change in color, brightness, and/or flashing upon the remaining time threshold being reached.

12. The camera according to claim 1, wherein the elapsed time indicator is about 40 percent opaque.

13. The camera according to claim 1, wherein the elapsed time indicator is a different color for different predetermined intervals.

14. The camera according to claim 1, wherein the leading end has a different shape than the trailing portion of the elapsed time indicator and the shape of the leading end is wider than the trailing portion of the elapsed time indicator.

15. A camera comprising:
  an image sensor;
  a display; and
  a physical button;
  wherein when the physical button is pressed by a user, a video recording having a predetermined time limit is captured with the image sensor, and the display displays a graphical user interface having a graphical indicator that forms a border of the display to only indicate an elapsed time of the video recording,
  wherein the graphical indicator changes appearance upon reaching a remaining time threshold to indicate an amount of time remaining;
  wherein a leading end of the graphical indicator is different than a trailing portion of the graphical indicator; and
  wherein the graphical indicator is transparent so that an image stream on the display is visible under the graphical indicator.

16. The camera according to claim 15, wherein the graphical indicator increases in length to a completed length proportionally as the elapsed time increases to the predetermined time limit; wherein the predetermined time limit is changeable by the user, and the completed length does not change as the predetermined time limit is changed, and wherein at the completed length, the graphical indicator and the display have common outer dimensions.

17. The camera according to claim 15, wherein the change in appearance upon reaching the remaining time threshold is irrespective of a predetermined recording duration or a relative value of the predetermined recording duration and the change is a change in brightness, opacity, consistency, flashing, and/or shape upon the remaining time threshold being reached.

18. The camera according to claim 15, further comprising visual increment markers that are distinct from the graphical indicator to indicate that a certain portion of the predetermined time limit has elapsed.

19. A method for recording a video with a camera having a display comprising:
  establishing a predetermined recording duration;
  initiating a video recording upon receipt of a user input;
  recording, with an image sensor, the video recording and simultaneously displaying, with a display, an image stream and a graphical user interface, with the graphical user interface having an elapsed time indicator that lengthens to form a border around the display indicating time elapsed of the video recording and not indicating time remaining of the video recording, wherein the elapsed time indicator is transparent so that the image stream is visible under the elapsed time indicator;
  stopping the recording upon the shorter of receiving another user input or the time elapsed equaling the predetermined recording duration;
  automatically changing the elapsed time indicator based upon an orientation of the camera; and
  changing an appearance of the elapsed indicator upon reaching a remaining time threshold to indicate an amount of time remaining.

20. The method of claim 19, wherein the border and the display have common outer dimensions.

* * * * *